United States Patent
Maheshwari (10) Patent No.: US 11,037,153 B2
(45) Date of Patent: Jun. 15, 2021

(54) DETERMINING IMPLICIT TRANSACTION CONSENT BASED ON BIOMETRIC DATA AND ASSOCIATED CONTEXT DATA

(71) Applicant: MasterCard International Incorporated, Purchase, NY (US)

(72) Inventor: Rajat Maheshwari, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 297 days.

(21) Appl. No.: 15/807,390

(22) Filed: Nov. 8, 2017

(65) Prior Publication Data

US 2019/0139050 A1    May 9, 2019

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06F 1/163* (2013.01); *G06F 21/32* (2013.01);
(Continued)

(58) Field of Classification Search
CPC ........ G06Q 20/12; G06Q 20/02; G06Q 20/40; G06Q 20/04; G06Q 20/20; G06Q 20/403; G06Q 20/202; G06Q 20/4014; G06Q 20/382; G06Q 20/10; G06Q 20/207; G06Q 20/40145; G06Q 20/401; G06Q 20/367;
(Continued)

(56) References Cited

U.S. PATENT DOCUMENTS

| 7,966,203 B1* | 6/2011 | Pietrzak | G06Q 40/08 705/4 |
| 2004/0020982 A1* | 2/2004 | Hoffman | G06Q 30/06 235/379 |

(Continued)

FOREIGN PATENT DOCUMENTS

WO    2017/048917 A1    3/2017

OTHER PUBLICATIONS

"What is GSR (Galvanic Skin Response) and How DOe sit Work?"; 8 pages, published on Jul. 17, 2018.*

*Primary Examiner* — Alexander G Kalinowski
*Assistant Examiner* — Sanjeev Malhotra (57) ABSTRACT

The disclosure facilitates a transaction by determining implicit consent for a transaction from a user by a wearable computing device. A request to complete the transaction is received, biometric data associated with the user is collected, and context data associated with the biometric data is received. In response to the request to complete the transaction, weighted values of the biometric data and the context data are generated based on defined consent rules. Upon the generated weighted values satisfying one or more consent thresholds, implicit consent is determined for the transaction from the user, whereby completion of the transaction is enabled. Accurately determining implicit consent of a user for a transaction based on the user's biometric data streamlines the transaction process into an efficient, user-friendly experience for the user while maintaining the security of the user's identity and account information.

20 Claims, 5 Drawing Sheets

(51) Int. Cl.
    *G06Q 20/38* (2012.01)
    *G06Q 30/06* (2012.01)
    *G06K 9/00* (2006.01)
    *H04W 4/02* (2018.01)
    *G06F 1/16* (2006.01)
    *G06F 21/32* (2013.01)
    *G06N 20/00* (2019.01)

(52) U.S. Cl.
    CPC ......... *G06K 9/00335* (2013.01); *G06N 20/00* (2019.01); *G06Q 20/322* (2013.01); *G06Q 20/382* (2013.01); *G06Q 30/06* (2013.01); *H04W 4/02* (2013.01)

(58) Field of Classification Search
    CPC ...... G06Q 20/405; G06Q 30/06; G06Q 20/00; G06Q 20/18; G06Q 20/3278; G06Q 20/385; G06Q 40/00; G06Q 20/36; G06Q 20/3674; G06Q 30/02; G06Q 20/023; G06Q 20/204; G06Q 20/3224; G06Q 20/3227; G06Q 20/327; G06Q 20/341; G06Q 20/342; G06Q 20/3585; G06Q 20/3821; G06Q 20/4097; G06Q 40/025; G06Q 20/0855; G06Q 20/102; G06Q 20/14; G06Q 20/206; G06Q 20/227; G06Q 20/322; G06Q 20/42; G06Q 30/0225; G06Q 30/0238; G06Q 30/04; G06Q 40/04; H04L 63/0861; H04L 2463/102; H04L 63/0428; H04L 63/04; H04L 63/0442; H04L 63/0823; H04L 63/083; H04L 67/306; H04L 69/329; H04L 9/3231; G06F 21/32; G06F 21/83; G06F 2211/008; G06F 2221/2117; G06F 21/554; G06F 21/86; G06F 21/33; G07C 9/00; G07C 9/00134; G07F 19/201; G07F 7/1008; G07F 19/207; G07F 11/002; G07F 7/025; G06K 9/00087; G06K 9/6255; H04W 12/06
    USPC ..... 705/14.21, 14.38, 17, 19, 21, 30, 39, 44, 705/64, 67, 35, 51, 80, 4; 726/7, 19; 235/379; 382/115
    See application file for complete search history.

(56) References Cited

U.S. PATENT DOCUMENTS

| | | | | |
|---|---|---|---|---|
| 2004/0098350 | A1* | 5/2004 | Labrou | G06Q 20/3674 705/64 |
| 2005/0203841 | A1* | 9/2005 | Hoffman | G06Q 20/00 705/39 |
| 2006/0064380 | A1* | 3/2006 | Zukerman | G06Q 20/40 705/44 |
| 2006/0106734 | A1* | 5/2006 | Hoffman | G06Q 20/18 705/64 |
| 2007/0106614 | A1* | 5/2007 | Proidl | G06F 21/10 705/51 |
| 2007/0291996 | A1* | 12/2007 | Hoffman | G07C 9/38 382/115 |
| 2009/0157518 | A1* | 6/2009 | Bishop | G06Q 20/40 705/19 |
| 2009/0157519 | A1* | 6/2009 | Bishop | G06Q 20/02 705/19 |
| 2009/0164324 | A1* | 6/2009 | Bishop | G06Q 20/204 705/17 |
| 2009/0164325 | A1* | 6/2009 | Bishop | G06Q 20/204 705/17 |
| 2009/0164326 | A1* | 6/2009 | Bishop | G06Q 20/20 705/19 |
| 2009/0164327 | A1* | 6/2009 | Bishop | G06Q 20/12 705/19 |
| 2009/0164328 | A1* | 6/2009 | Bishop | G06Q 20/20 705/19 |
| 2009/0164329 | A1* | 6/2009 | Bishop | G06Q 20/202 705/19 |
| 2009/0164330 | A1* | 6/2009 | Bishop | G06Q 20/202 705/19 |
| 2009/0164331 | A1* | 6/2009 | Bishop | G06Q 20/20 705/19 |
| 2009/0228362 | A1* | 9/2009 | Lapsley | H04L 63/04 705/44 |
| 2009/0254462 | A1* | 10/2009 | Tomchek | G06Q 40/00 705/30 |
| 2009/0265249 | A1* | 10/2009 | Bishop | G06Q 20/202 705/21 |
| 2009/0271278 | A1* | 10/2009 | Bishop | G06Q 20/20 705/21 |
| 2009/0287565 | A1* | 11/2009 | Bishop | G06Q 20/403 705/14.38 |
| 2009/0289106 | A1* | 11/2009 | Bishop | G06Q 20/12 235/379 |
| 2009/0299841 | A1* | 12/2009 | Bishop | G06Q 30/0238 705/14.21 |
| 2012/0079581 | A1* | 3/2012 | Patterson | H04L 63/0861 726/7 |
| 2012/0117633 | A1* | 5/2012 | Chakra | H04L 9/3231 726/7 |
| 2012/0189170 | A1* | 7/2012 | Uno | G06K 9/00087 382/115 |
| 2012/0323794 | A1* | 12/2012 | Livshits | G06Q 30/02 705/80 |
| 2012/0330838 | A1* | 12/2012 | Hoffman | G06Q 20/40 705/44 |
| 2014/0059675 | A1* | 2/2014 | Batie, Jr. | G06F 21/32 726/19 |
| 2014/0258123 | A1* | 9/2014 | Fernandes | G06Q 20/401 705/44 |
| 2015/0120552 | A1* | 4/2015 | He | G06Q 20/40145 705/44 |
| 2016/0019536 | A1* | 1/2016 | Ortiz | G06Q 20/3227 705/67 |
| 2016/0239534 | A1* | 8/2016 | Evans | G06F 9/445 |
| 2017/0017958 | A1* | 1/2017 | Scott | G06Q 20/36 |
| 2017/0103396 | A1* | 4/2017 | Smets | G06Q 20/4014 |
| 2017/0202514 | A1* | 7/2017 | Nousiainen | A61B 8/4227 |
| 2017/0228715 | A1* | 8/2017 | Gurunathan | G06Q 20/047 |
| 2017/0278094 | A1* | 9/2017 | Mackie | G06Q 20/3278 |
| 2017/0286789 | A1* | 10/2017 | Wintergerst Lavin | G06K 9/00912 |
| 2017/0308891 | A1* | 10/2017 | deOliveira | G06Q 20/382 |
| 2018/0005241 | A1* | 1/2018 | Smothers | G06Q 20/3223 |
| 2018/0063709 | A1* | 3/2018 | Morrison | H04L 9/3236 |
| 2018/0068313 | A1* | 3/2018 | Van Os | G06Q 20/342 |
| 2018/0096354 | A1* | 4/2018 | Kohli | G06F 21/32 |
| 2018/0139608 | A1* | 5/2018 | Wilson | G06Q 20/3229 |
| 2018/0181955 | A1* | 6/2018 | Woods | G06Q 20/3224 |
| 2018/0253727 | A1* | 9/2018 | Ortiz | G06Q 20/325 |
| 2018/0293573 | A1* | 10/2018 | Ortiz | G06Q 20/20 |
| 2018/0325426 | A1* | 11/2018 | Shaw | G06N 3/0454 |
| 2019/0012675 | A1* | 1/2019 | Kumnick | G06Q 20/123 |
| 2019/0095600 | A1* | 3/2019 | Chan | G06F 21/316 |
| 2019/0095914 | A1* | 3/2019 | Griggs | G06Q 20/40 |
| 2019/0261874 | A1* | 8/2019 | Berg | A61B 5/0205 |
| 2019/0374124 | A1* | 12/2019 | Kronstedt | A61B 5/274 |

* cited by examiner

DETERMINING IMPLICIT TRANSACTION CONSENT BASED ON BIOMETRIC DATA AND ASSOCIATED CONTEXT DATA

BACKGROUND

Modern technology provides users with options for how to complete transactions at merchants. In particular, personal computing devices, such as smart phones, tablets, or wearable computing devices, provide payment applications that enable users to complete transactions without the use of cash or a physical credit or debit card. The use of such payment applications typically requires a link to an account (e.g., a bank account, a credit account, etc.). During a transaction, in order to protect a user's identity and/or account from fraudulent activity, a user is required to provide both authentication of the user's identity and explicit consent to complete the transaction. The authentication may be provided through the use of passwords, personal identification numbers (PINs), or the like, while consent is typically provided via prompt that the user must answer to authorize the transaction. Methods of consent to transactions may differ between different merchants and/or merchant locations, which may result in a confusing or frustrating user experience each time the user makes a purchase. Further, transactions at points of sale at merchants may be slowed by the authentication and consent steps of the process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for determining implicit consent for a transaction from a user by a wearable computing device of the user is described. The method comprises receiving a request to complete the transaction, collecting biometric data associated with the user, and receiving context data associated with the biometric data. In response to the request to complete the transaction, weighted values of the biometric data and the context data are generated based on defined consent rules. Upon the generated weighted values satisfying one or more consent thresholds, implicit consent is determined for the transaction from the user, whereby completion of the transaction is enabled.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The systems and methods described herein are configured to facilitate a transaction by determining implicit consent to the transaction by a user based on biometric data and associated context data. The disclosure enables efficient, user-friendly transactions at merchants, potentially eliminating the explicit consent action that a user must take in order to complete the transaction.

A request to complete the transaction is received. Biometric data associated with the user is collected and context data associated with the biometric data is received. In response to the request to complete the transaction, weighted values of the biometric data and the context data are generated based on defined consent rules. Upon the generated weighted values satisfying one or more consent thresholds, implicit consent is determined for the transaction from the user, whereby completion of the transaction is enabled.

The use of biometric data and associated context data to determine whether a user implicitly consents to a transaction provides an efficient way to determining consent that does not require any specific action from the user. Further, defined consent rules and consent thresholds used to determine implicit consent maintain the security of the user's identity and/or accounts against fraudulent activity. For many transactions, user may be enabled to quickly complete transactions with a simple hand gesture, vocal statement, or other similar, user-friendly ways. In some cases, determining implicit consent on the user's wearable computing device results in no additional action being required for the user to consent to the transaction, completely eliminating a step from the transaction process. Further, the user doesn't even need to remove a wallet or smart phone from their pocket due to the use of wearable computing devices as described herein. The interaction between the user and device is improved, providing for smoother transactions. Automated operation of described wearable computing devices is improved by eliminating a user interaction from a frequent user workflow. Further, biometric hardware that is already present in wearable computing devices is efficiently used to provide additional functionality to the user.

Figure 1:
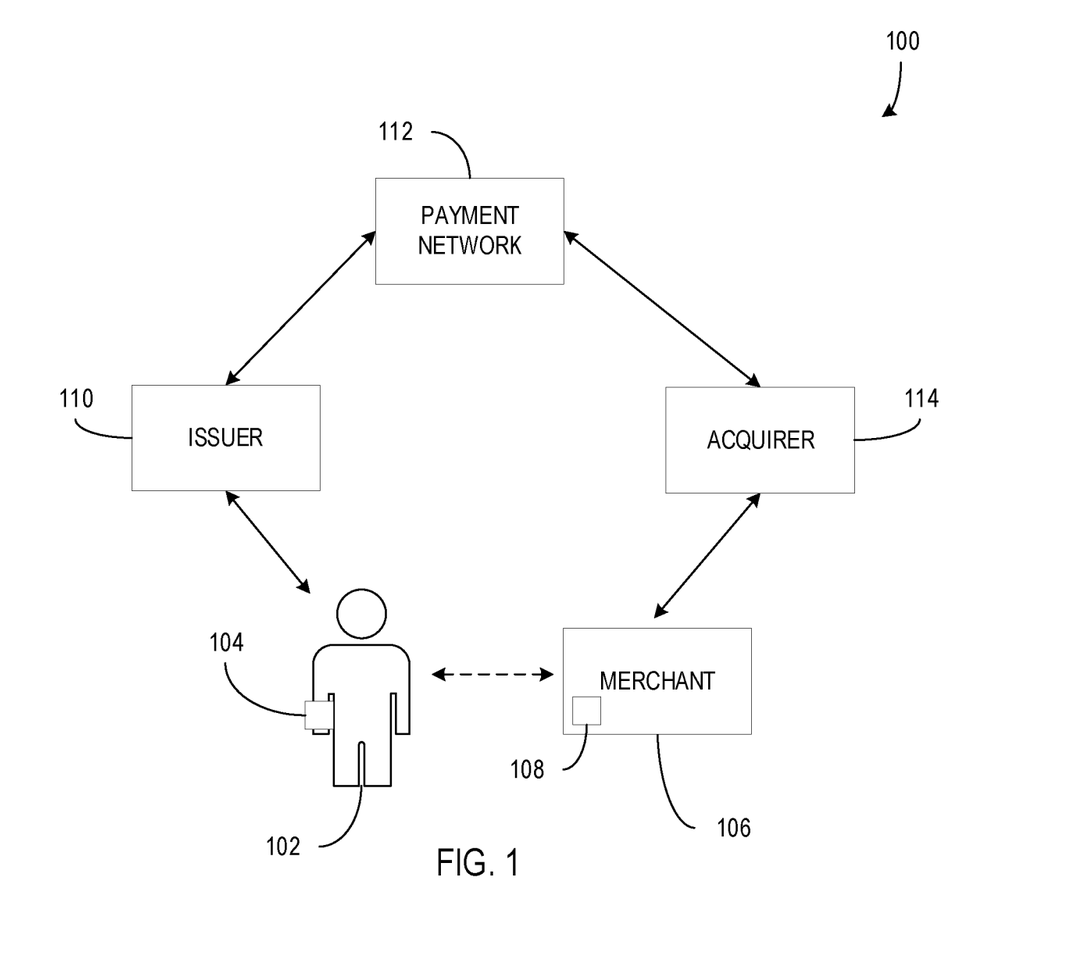
FIG. 1 is an exemplary block diagram illustrating a system configured for facilitating a transaction based on a between a user and a merchant using the user's wearable computing device according to an embodiment.

FIG. 1 is an exemplary block diagram illustrating a system 100 configured for facilitating a transaction between a user 102 and a merchant 106 using the user's wearable computing device 104 according to an embodiment. A transaction is initiated at the merchant 106 by the user 102 using the wearable computing device 104 at a point of sale device 108 of the merchant 106. The transaction is further facilitated by an issuer 110, a payment network 112, and an acquirer 114.

The wearable computing device 104 may be worn around the user 102's wrist (e.g., a smart watch, an exercise tracking device, etc.), neck, ankle, pocket, or on other parts of the user 102's body. The wearable computing device 104 is associated with a credit account, debit or bank account, or other similar financial account of the user 102. The associated account is issued to the user 102 by the issuer 110 (e.g., a bank, credit union, or other account issuing entity that has issued the user 102's account to the user 102, etc.). The wearable computing device 104 may include an application (e.g., a mobile app, etc.) associated with the user's account and/or provided by the issuer 110, the payment network 112, and/or another bank or similar entity.

At the merchant 106, the user 102 may initiate a transaction with the wearable computing device 104 such that the payment for the transaction is directed from the associated account of the user 102. The wearable computing device 104 may communicate with a point of sale (POS) device 108 at the merchant 106 using wireless communications (e.g., BLUETOOTH, near field communication (NFC), etc.). Alternatively, or additionally, the wearable computing device 104 may communicate with the merchant 106 over the Internet or other similar network communication.

The merchant 106 has an account or accounts in which it receives payment for transactions. The merchant 106's account is issued to the merchant 106 or a party associated with the merchant 106 by the acquirer 114 (e.g., a bank, credit union, other issuing and/or acquiring entity that has issued the merchant 106's account to the merchant 106 and acquires payment from the user 102's account, etc.). During a transaction initiated by the user 102 at the merchant 106, the transfer of funds between the user 102's account and the merchant 106's account includes interaction between the issuer 110 and acquirer 114, which is facilitated by the payment network 112. The transaction facilitation via the issuer 110, payment network 112, and acquirer 114 may occur according to methods that would be understood by a person of ordinary skill in the art.

In some examples, a transaction requires authentication of the user 102 and consent from the user 102. The authentication of the user 102 may be obtained by the user explicitly providing personal information, a password, personal identification number (PIN), or the like. Further, the authentication of the user 102 may include persistent authentication, such that the user 102 is authenticated when the user 102 puts on the wearable computing device 104 and the user 102 remains authenticated by the wearable computing device 104 for as long as the wearable computing device 104 is worn. The wearable computing device 104 may include sensors or other interfaces that detect that the wearable computing device 104 is being worn to enable persistent authentication. Alternatively, or additionally, authentication of the user 102 may last for a defined time period after authentication information is provided by the user 102. For instance, user 102 may provide authentication information and the user 102 may be considered authenticated for 2 hours after the authentication information was provided. In other examples, other time periods (e.g., 6 hours, 1 day, 30 minutes, 5 minutes, etc.) may be used. Consent for a transaction from user 102 may be explicit or implicit, as described herein.

Figure 2:
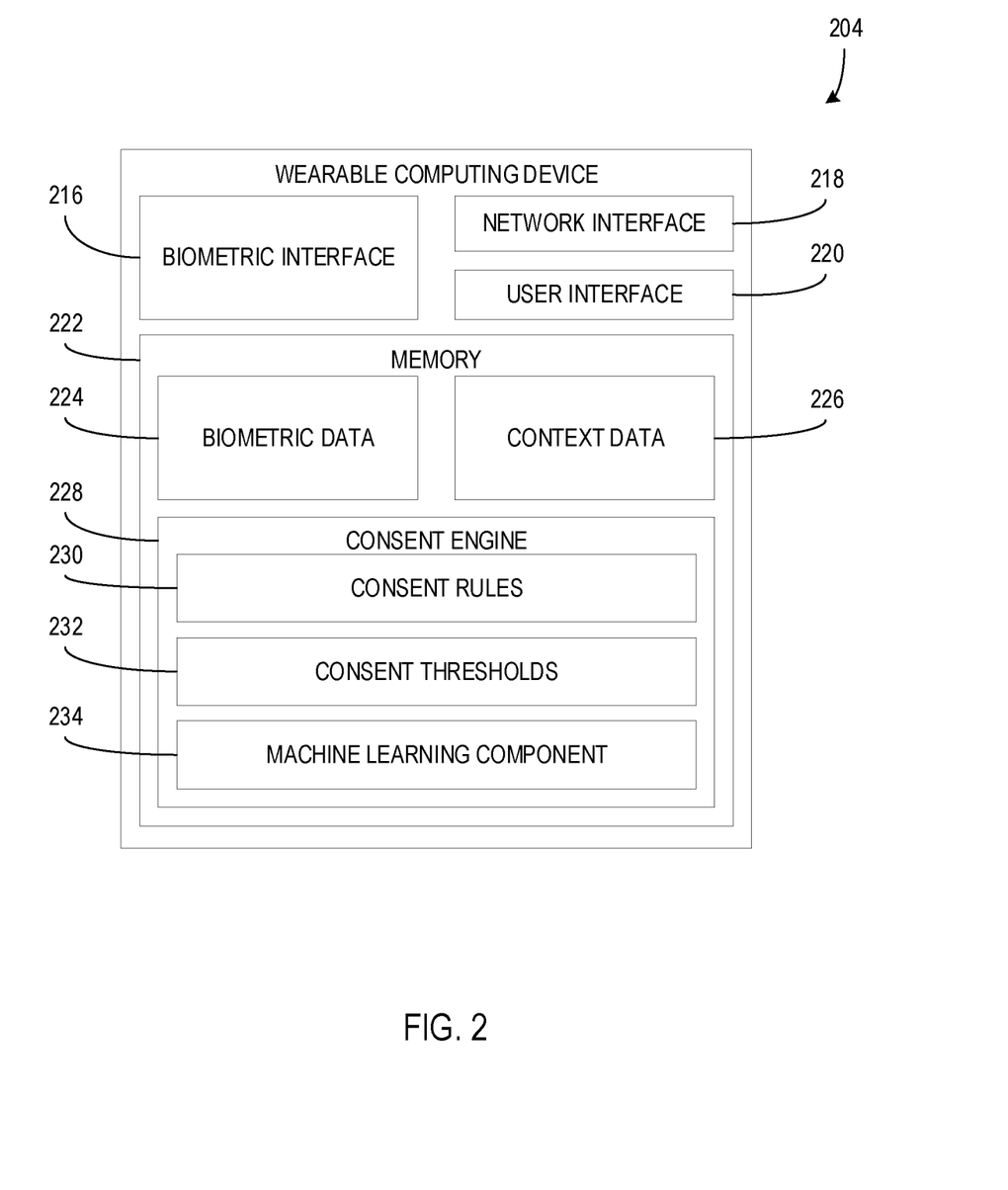
FIG. 2 is an exemplary block diagram illustrating a wearable computing device configured for determining implicit transaction consent according to an embodiment.

FIG. 2 is an exemplary block diagram illustrating a wearable computing device 204 configured for determining implicit consent to a transaction according to an embodiment. The wearable computing device 204 may be worn on a user's wrist, neck, finger, ankle, waist, or otherwise worn on the user's body. The wearable computing device 204 may include a single object or multiple associated objects (e.g., two associated bracelet devices worn on both wrists, etc.).

The wearable computing device 204 includes a biometric interface 216, a network interface 218, and a user interface 220. The biometric interface 216 may include one or more interfaces for collecting biometric data (e.g., biometric data 224, etc.) associated with the user wearing the wearable computing device 204. For instance, the biometric interface may include skin contact interfaces for determining pulse, heart rate, and/or galvanic skin response (GSR) or other electrodermal activity. A pulse or heart rate may be detected by interfaces that use photoplethysmography (PPG) (using light from LEDs to measure blood flow through nearby blood vessels), electrocardiography (ECG) (using electrodes in contact with the skin to detect electrical activity of the user's heart), or the like. GSR may be detected by interfaces that include electrodes in contact with the user's skin that are used to detect the conductance of the skin between the electrodes. Other biometric data and/or biometric patterns may also be collected via the biometric interface 216, such as skin temperature, body motion patterns (e.g., by gyroscopic sensors, accelerometers, etc.), voice patterns, fingerprints, palm prints, hand geometry, iris and/or retina recognition, etc. The biometric interface 216 may include interfaces necessary to collect one or more types of biometric data based on the configuration of the wearable computing device 204.

The network interface 218 enables the wearable computing device 204 to be in contact and communicate with other devices. The network interface 218 may enable the wearable computing device 204 to communicate wirelessly and/or over a wired connection. The network interface 218 may include interfaces for Bluetooth networks, NFC, Wi-Fi networks, cellular networks, and the like. As described above, the network interface 218 may be used by the wearable computing device 204 to interact with points of sale at merchants and also with other computing devices associated with the user of the wearable computing device 204 or other users. For instance, the wearable computing device 204 may communicate with another computing device of the user (e.g., a mobile phone, a tablet, a laptop computer, etc.) as a companion device to send and receive configuration or settings data, collected biometric data, or the like. Alternatively, or additionally, the wearable computing device 204 may use the network interface 218 to communicate with another person's computing device in order to send a text message, facilitate a voice call, or other similar communication.

The user interface 220 of the wearable computing device 204 enables the user of the wearable computing device 204 to interact directly with the wearable computing device 204. The user interface 220 may include a display, a touch screen, one or more buttons or switches, a microphone, a camera, etc. The user may use the user interface 220 to provide instructions to the wearable computing device 204, respond to prompts from the wearable computing device 204, etc.

The wearable computing device 204 further includes a memory 222, which may include one or more types of computer memory (e.g., random access memory (RAM), etc.) and/or data storage (e.g., disk drives, solid state drives, etc.). The memory 222 stores biometric data 224, context data, 226, and a consent engine 228. The biometric data 224 and context data 226 may be collected, gathered, obtained, or otherwise received from interfaces (e.g., biometric interface 216, network interface 218, user interface 220, etc.) of the wearable computing device 204 as described herein. Further, biometric 224 and/or context data 226 may be derived by combining other data already collected, gathered, or received. For instance, an activity (e.g., exercising, commuting, sleeping, etc.) of the user of the wearable computing device 204 may be derived based on collected location data (e.g., global positioning system (GPS) data, cellular tower triangulation data, etc.), time data, heart rate biometric data, and past behavior pattern data, etc.

The biometric data 224 includes data collected from the biometrics of the user of the wearable computing device 204, such as heart rate, pulse, GSR, skin temperature, body motion patterns, voice patterns, fingerprints, palm prints, hand geometry, iris and/or retina recognition, etc. The context data 226 may be associated with the collected biometric data 224 in order to give context thereto, such as time data of when the biometric data 224 is collected, location data of where the biometric data 224 is collected, past behavior pattern of the user, transaction data associated with recently collected biometric data 224, etc.

The consent engine 228 is a software component of the wearable computing device 204 that is configured to determine implicit consent of the user, or lack thereof, based on the biometric data 224 and context data 226. The consent engine includes consent rules 230, consent thresholds 232, and a machine learning component 234. The consent rules 230 are applied by the consent engine 228 to the biometric data 224 and the context data 226 in order to generate weighted values from the data. The generated weighted values are combined and compared to consent thresholds 232 to determine if implicit consent to a transaction is given by the user.

A consent rule 230 may determine a weight to apply to a biometric data value based on other biometric data 224 and/or context data 226. For instance, a heart rate value or GSR value that is abnormal may generally be weighted strongly by a consent rule against implicit consent being determined (e.g., a user with a high heart rate or an abnormal GSR value may be nervous, stressed, under duress, etc. which may indicate a situation where the user does not want to consent to the transaction), such that implicit consent for a transaction when the high heart rate value or abnormal GSR value is collected is unlikely to be determined. However, another consent rule may be defined that takes other context data into consideration, such as motion data, location data, or past behavior pattern data. When the context data indicates that the user is exercising and that is the reason for the elevated heart rate value, the generated weighted value of the elevated heart rate may be less strongly against determining implicit consent, or it may be weighted in favor of determining implicit consent.

In another example, collected biometric data indicates that the user is calm and in an appropriate emotional state for consenting to a transaction, but other context data (e.g., time of day data, location data indicating the user is at home, motion data indicating that the user is relatively still, etc.) indicates that the user is asleep. An associated consent rule may be used to generate a weighted value for the collected biometric data that is very weakly weighted for determining implicit consent, as implicit consent should not be determined when the user is asleep or otherwise unable to consent.

Other types of biometric data (e.g., common hand or wrist motions during transactions, voice patterns during transactions, etc.) and context data (e.g., behavior patterns based on commonly traveled routes, stops at stores, repeated transaction information, etc.) may be used in other combinations to determine implicit consent or lack thereof for a transaction from a user without departing from the description herein.

The consent thresholds 232 include at least one threshold to which the generated weighted values are compared to determine implicit consent to the transaction by the user. There may be more than one consent threshold 232, such that the consent thresholds 232 may indicate different confidence levels associated with implicit consent (e.g., higher confidence level thresholds may simply determine that implicit consent is present, while lower confidence level thresholds may determine the implicit consent, but flag the transaction for follow up by the user or an entity associated with the transaction, etc.), a lack of implicit consent (e.g., a negative threshold when compared to thresholds that indicate implicit consent when satisfied, etc.), or the like. Further, consent thresholds 232 may be defined as static values or they may dynamically change based on the biometric data 224 and/or context data 226 being used by the consent engine 228.

The weighted values may be combined by additively, multiplicatively, or by other methods of combination in order to compare them to the consent thresholds 232. For instance, a consent threshold 232 may be defined as 100, such that when the sum of the weighted values equals or exceeds 100, the implicit consent is determined. The weighted values of the biometric data and context data are generated based on the consent rules, added together, and compared to the threshold of 100. In this case, the relative importance of each data value used to generate the weighted values is reflected in the range of weighted values that may result from application of the consent rules to the data value. For instance, biometric data that the user made a known arm gesture that indicates consent may result in a heavily weighted value (e.g., 50, 75, 95, etc.) in comparison to the threshold. Alternatively, biometric data that indicates a user's skin temperature may be less heavily weighted (e.g., 2, 5, 10, etc.), reflecting its relative insignificance in determining implicit consent.

Additionally, or alternatively, the consent thresholds 232 may include one or more thresholds that indicate whether there is sufficient data to determine implicit consent. For instance, a consent threshold 232 may be defined to require greater than 3 biometric data values, context data values, and/or resulting weighted values to confidently determine whether implicit consent is present. In an example, even if several of the generated weighted values are weighted highly in favor of implicit consent, if the total data being drawn from does not exceed the requirement, implicit consent cannot be determined.

In some examples, the consent thresholds may be based on the amount being spent on the transaction. For instance, a consent threshold for implicit consent may be low (e.g., implicit consent is easily determined, etc.) when the amount spent is $20 or less, whereas the consent threshold for implicit consent may be high (e.g., implicit consent is unlikely to be determined, such that explicit consent may be required, etc.) when the amount spent is $100 or more. Other threshold values may be used without departing from the description herein.

The machine learning component 234 of the consent engine 228 collects feedback associated with the implicit consent determinations of the consent engine 228 and updates or otherwise adjusts the consent rules 230 and/or consent thresholds 232 based on machine learning techniques to improve the accuracy of the consent engine 228 in determining implicit consent. Feedback may be collected by prompting the user of the wearable computing device 204 or the consent engine 228 may provide an interface through which a user may actively provide feedback at will. If the feedback is positive (e.g., the implicit consent was accurately determined or a lack of implicit consent was accurately determined, etc.), the machine learning component 234 may adjust consent rules 230 and/or consent thresholds 232 to reinforce the determination made by the consent engine 228. Alternatively, after positive feedback, no adjustments may be made if the performance of the consent engine 228 is considered to be sufficiently accurate. If the feedback is negative (e.g., the implicit consent was inaccurately determined or implicit consent should have been determined but was not, etc.), the machine learning component 234 may adjust consent rules 230 and/or consent thresholds to correct the consent engine 228 such that it performs accurately in similar future transactions.

In some examples, the machine learning component 234 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning component 234, in some examples, may operate according machine learning principles and/or techniques known in the art without departing from the systems and/or methods described herein.

The machine learning component 234 is arranged to execute the methods described herein to determine consent rule and consent threshold adjustments in a manner which allows for improved performance when determining implicit consent at the wearable computing device 204.

In an example, the machine learning component 234 or other machine learning engine may make use of training data pairs when applying machine learning techniques and/or algorithms. Millions of training data pairs (or more) may be stored in a machine learning data structure. In some examples, a training data pair includes a feedback data value paired with a consent rule adjustment value. The pairing of the two values demonstrates a relationship between the feedback data value and the consent rule adjustment value that may be used by the machine learning component 234 to determine future consent rule adjustments according to machine learning techniques and/or algorithms.

While the machine learning component 234 is illustrated as a part of the consent engine 228 on the wearable computing device 204, in some examples, the machine learning component 234 may be located on another computing device with which the wearable computing device 204 is in communication, such as a companion computing device (e.g., an associated smart phone, etc.), or a server. It should be understood that other arrangements of the software modules on the wearable computing device 204 and related computing devices may be used without departing from the description herein.

Figure 3:
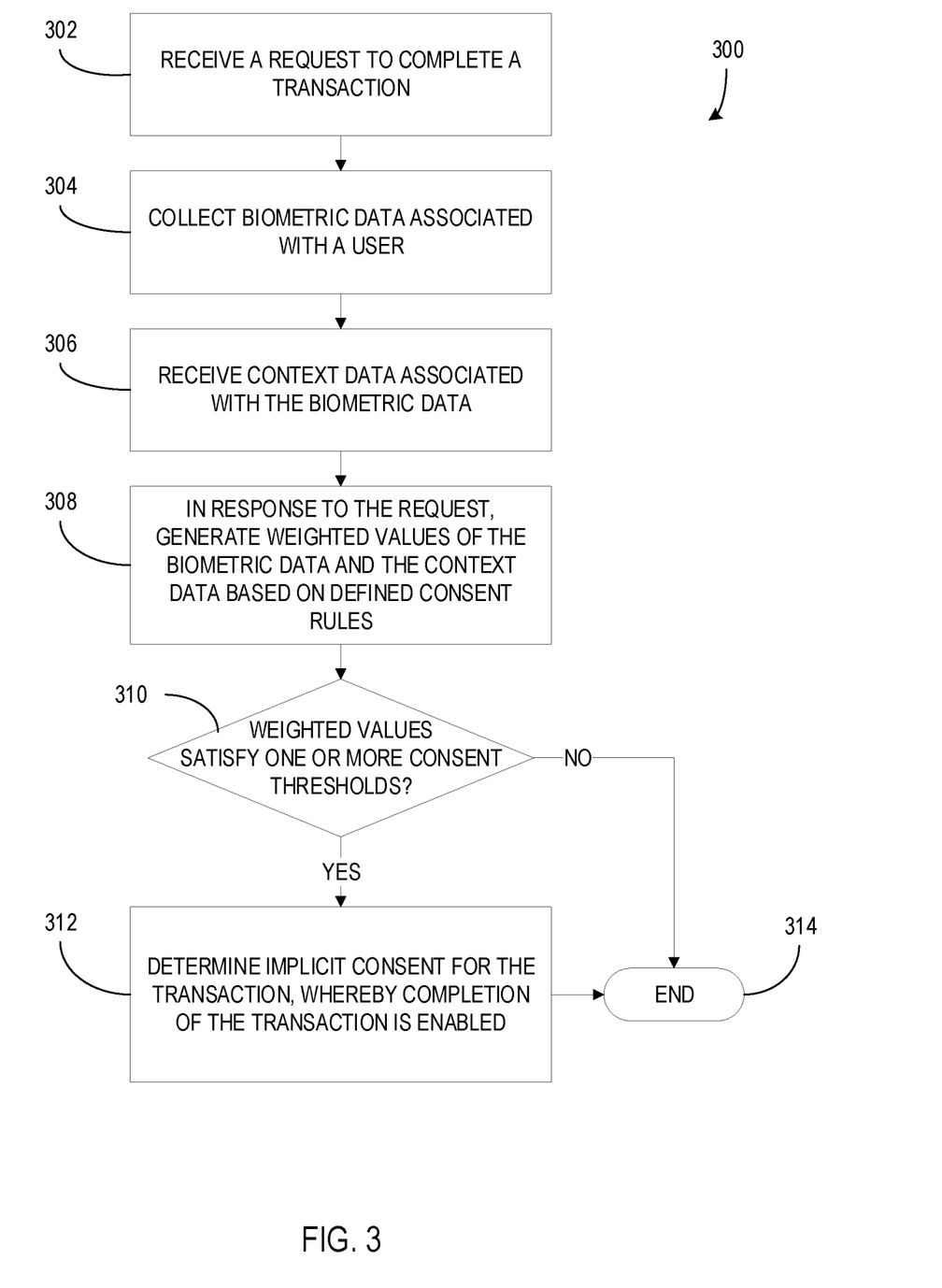
FIG. 3 is an exemplary flow chart illustrating determining implicit transaction consent based on biometric data and associated context data according to an embodiment.

FIG. 3 is an exemplary flow chart 300 illustrating determining implicit transaction consent based on biometric data and associated context data according to an embodiment. In an example, the method described in FIG. 3 is executed on a wearable computing device (e.g., wearable computing device 204, etc.). At 302, a request to complete a transaction is received. The request may be received from a point of sale (e.g., point of sale device 108, etc.) in a merchant (e.g., merchant 106, etc.) or from another computing device via a network interface (e.g., network interface 218, etc.).

At 304, biometric data associated with a user (e.g., user 102, etc.) is collected. The biometric data (e.g., biometric data 224, etc.) may be collected via one or more biometric interfaces, sensors, or the like (e.g., biometric interface 216, etc.) on a wearable computing device of the user, as described herein. The collection of biometric data may occur as a result of receiving the request to complete a transaction. Alternatively, or additionally, the biometric data may be collected periodically or in response to other events (e.g., a heart rate level or GSR level may be collected once every five minutes or in response to the wearable computing device being initially worn, etc.). In some examples, the collected biometric data is stored in memory (e.g., memory 222, etc.) of the wearable computing device. Further, the biometric data may be sent, transmitted, or transferred to other computing devices as well, such as a server associated with the consent engine or a related application, etc.

In addition to the biometric data, context data associated with the biometric data is received at 306. The context data may also be received in response to the received request to complete a transaction, in response to other events, and/or periodically. The context data may be received from biometric interfaces, network interfaces, user interfaces, or other interfaces and/or sensors (e.g., a GPS location interface/sensor, etc.). Further, context data may be obtained from data already present on the wearable computing device (e.g., time data being derived from the interior clock of the wearable computing device, etc.) or derived from combinations of data (e.g., combinations of biometric data and/or context data, etc.) as described herein.

At 308, in response to the request to complete a transaction, weighted values of the biometric data and the context data are generated based on defined consent rules. A weighted value of a biometric or context data value may be based on a range associated with the biometric or context data value and where the biometric or context data value fall within the range. For instance, a GSR value in a range that indicates the user is calm may cause a high weighted value of the GSR value to be generated, while a GSR value in a range that indicates the user is distressed or in a negative mood may cause a relatively lower weighted value of the GSR value to be generated. In this way, a "calm" GSR value is more likely to cause implicit consent to be determined than a "distressed" GSR value.

At 310, if the generated weighted values satisfy one or more consent thresholds, implicit consent for the transaction is determined at 312. The completion of the transaction may be enabled by determining the implicit consent. In some examples, determining implied consent to the transaction by the user causes the transaction to proceed from the user to the issuer of the user's account and onward, as described in FIG. 1. User authentication may also be required for the transaction to proceed. Further, other devices involved in the transaction may require additional input, such as a POS device. In some examples, while consent is found implicitly on the wearable computing device of the user, the user may still be required by the POS device of the merchant to confirm consent to the transaction (e.g., by pressing a button, touching a touchscreen, etc.).

The user may be notified by the wearable computing device and/or a point of sale that implied consent was determined. For instance, the wearable computing device may provide a notification via light, sound, vibration, on-screen indicator, or the like.

If the weighted values do not satisfy one or more consent thresholds at 310, the transaction may be canceled, or otherwise end, at 314, as the user has not consented to the transaction. In some examples, failure of the implicit consent determination may cause other events, such as notification to the user and/or other party to the transaction, etc.

In some examples, the methods described herein occur entirely locally on a wearable computing device (e.g., wearable computing device 204, etc.). The wearable computing device determines implicit consent or lack thereof without contacting a bank, accessing a server, or otherwise communicating with other computing devices, apart from necessary communications with a point of sale device or the like. In alternative examples, some portions of the methods described herein may occur remotely on an associated server, in the cloud, and/or on other associated computing devices.

Figure 4:
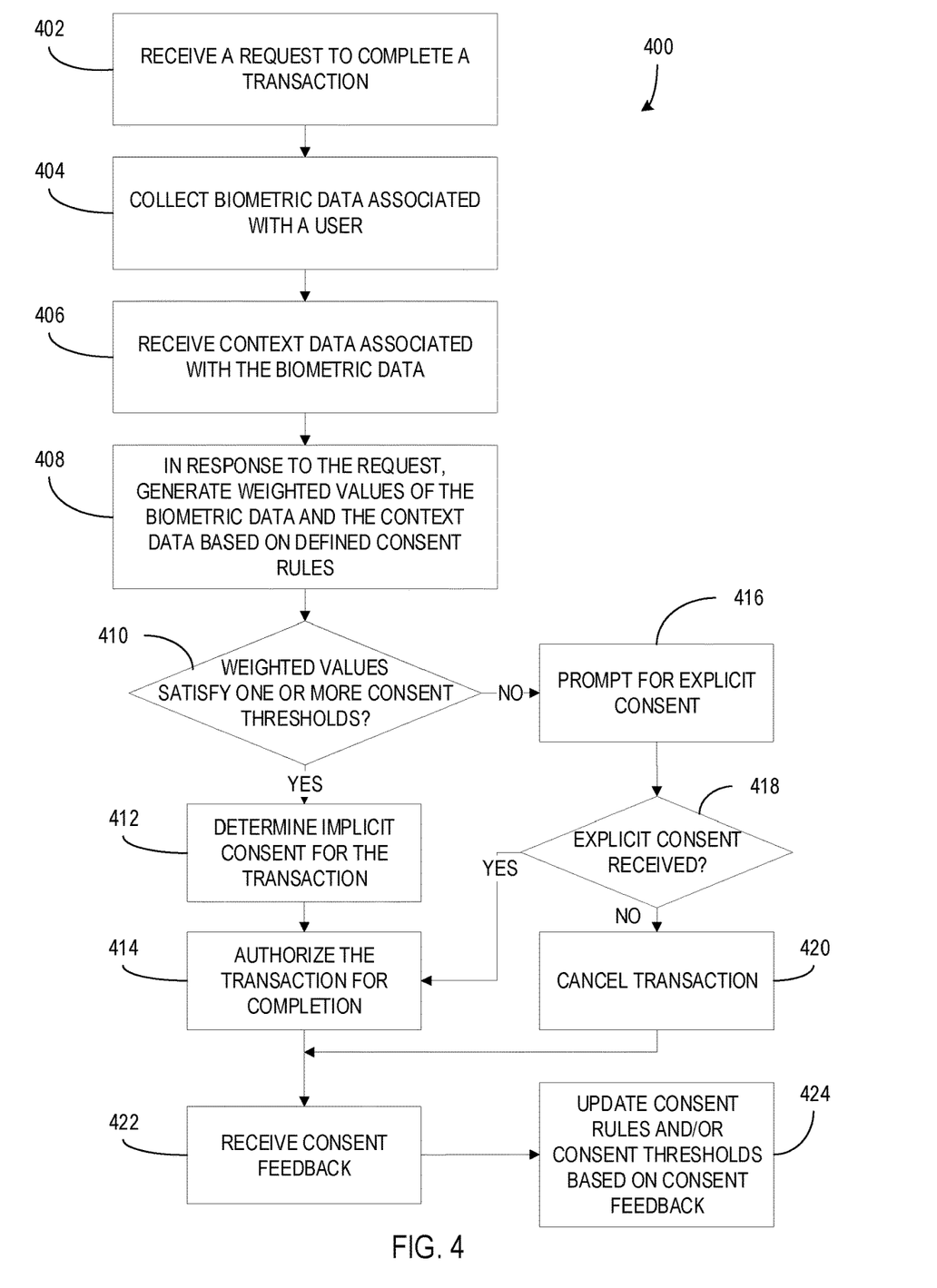
FIG. 4 is an exemplary flow chart illustrating determining implicit transaction consent as in FIG. 3, prompting for consent if necessary, and updating consent rules and/or consent thresholds based on received feedback according to an embodiment.

FIG. 4 is an exemplary flow chart 400 illustrating determining implicit transaction consent as in FIG. 3, prompting for consent if necessary, and updating consent rules and/or consent thresholds based on received feedback according to an embodiment. From 402 to 408, the data is collected and/or received and weighted values are generated in a substantially identical process as described above with respect to FIG. 3. At 410, if the weighted values satisfy one or more consent thresholds, implicit consent is determined for the transaction as described above with respect to 312 of FIG. 3. At 414, the transaction is authorized for completion. The authorization may be provided to a merchant via a point of sale, which may then proceed with the transaction via acquirer, payment network, and/or issuer as described with respect to FIG. 1.

If, at 410, the weighted values do not satisfy one or more consent thresholds, the user of the wearable computing device may be prompted for explicit consent at 416. The prompt may be provided to the user on the wearable computing device (e.g., a prompt on a screen of the wearable computing device may provide the user an option to consent, etc.), on another linked device (e.g., a smart phone acting as a companion device to the wearable computing device, etc.), and/or on the point of sale of the merchant (e.g., a message may be displayed indicating that implicit consent was not determined and offering the user a choice to explicitly consent or not, etc.). If, at 418, explicit consent is received from the user, the transaction is authorized for completion at 414. If explicit consent is not received at 418, the transaction is canceled at 420.

After the transaction is authorized or canceled, consent feedback may be received at 422. The feedback may be actively provided by the user of the wearable computing device (e.g., the user may decide that implicit consent should have been determined and was not during a recent transaction, so the user inputs feedback to the wearable computing device to notify the system of the inaccuracy during the recent transaction, etc.). Alternatively, or additionally, the user may be prompted to provide feedback periodically and/or in response to particular transactions, determinations of implicit consent, etc. For instance, the consent engine may prompt the user to provide feedback for the implicit consent determination of a transaction once a week, or once every ten transactions, etc. In another example, the consent engine prompts the user for feedback after transactions that occur that are outside of the normal behavior patterns of the user. Further, determining no implicit consent and then receiving explicit consent for a transaction may be used as feedback that the determination of no implicit consent was inaccurate for the purpose of feedback collection.

At 424, the consent rules and/or consent thresholds are updated or otherwise adjusted based on the consent feedback received. The adjustments made may be based on machine learning techniques as described herein. For instance, a consent rule may be adjusted to generate a larger weighted value from a biometric data value when the consent feedback indicates that implied consent should have been determined in a recent transaction involving the biometric data value but was not determined.

Updating of consent rules and/or consent thresholds may be done in response to receiving consent feedback and/or periodically based on feedback that has been received throughout the previous period.

Additional Example Scenarios

Aspects of the disclosure enable various additional scenarios, such as next described.

In an example, a user approaches a point of sale at a merchant to make a purchase. The user is wearing a smart watch including the consent engine as described herein. The user brings the smart watch near the point of sale to provide the merchant with payment account information. The smart watch collects a galvanic skin response data value from the user in response to the transaction being initiated. The user is persistently authenticated while wearing the smart watch. The consent engine of the smart watch applies consent rules to the galvanic skin response data value and motion data gathered when the user moved the smart watch near to the point of sale at the beginning of the transaction. Weighted values are generated based on the consent rules, combined, and compared to consent thresholds by the consent engine. Because the galvanic skin response data value indicates that the user is in a calm, normal state of mind and the gesture with the smart watch was recognized as a motion associated with consent to previous transactions, the weighted values satisfy a consent threshold and implied consent to the transaction is determined. The user need not take any other action to consent to the transaction and thereby authorize the transaction to continue.

In another example, a user wearing a smart watch including the consent engine described herein has just finished an exercise session and approaches a point of sale at a merchant to make a purchase. The transaction is initiated and the user's identity is authenticated via persistent authentication associated with the smart watch. The smart watch collects heart rate data of the user using biometric interfaces as well as recording location and time data. The consent engine checks for implied consent by applying consent rules to the heart rate data and the associated location and time context data, generating weighted values, and comparing the weighted values to consent thresholds. Due, in part, to the user's heart rate being abnormally elevated from the recent exercise session, the consent thresholds are not satisfied and implied consent is not determined. The user is prompted to provide explicit consent to authorize the transaction. Later, the user provides feedback that implied consent should have been determined as the elevated heart rate was due to exercise and not any sort of abnormal distress. The consent engine adjusts the consent rules and/or consent thresholds in response to the feedback such that, during a later similar transaction, implicit consent is determined despite the user's elevated heart rate.

Exemplary Operating Environment

Figure 5:
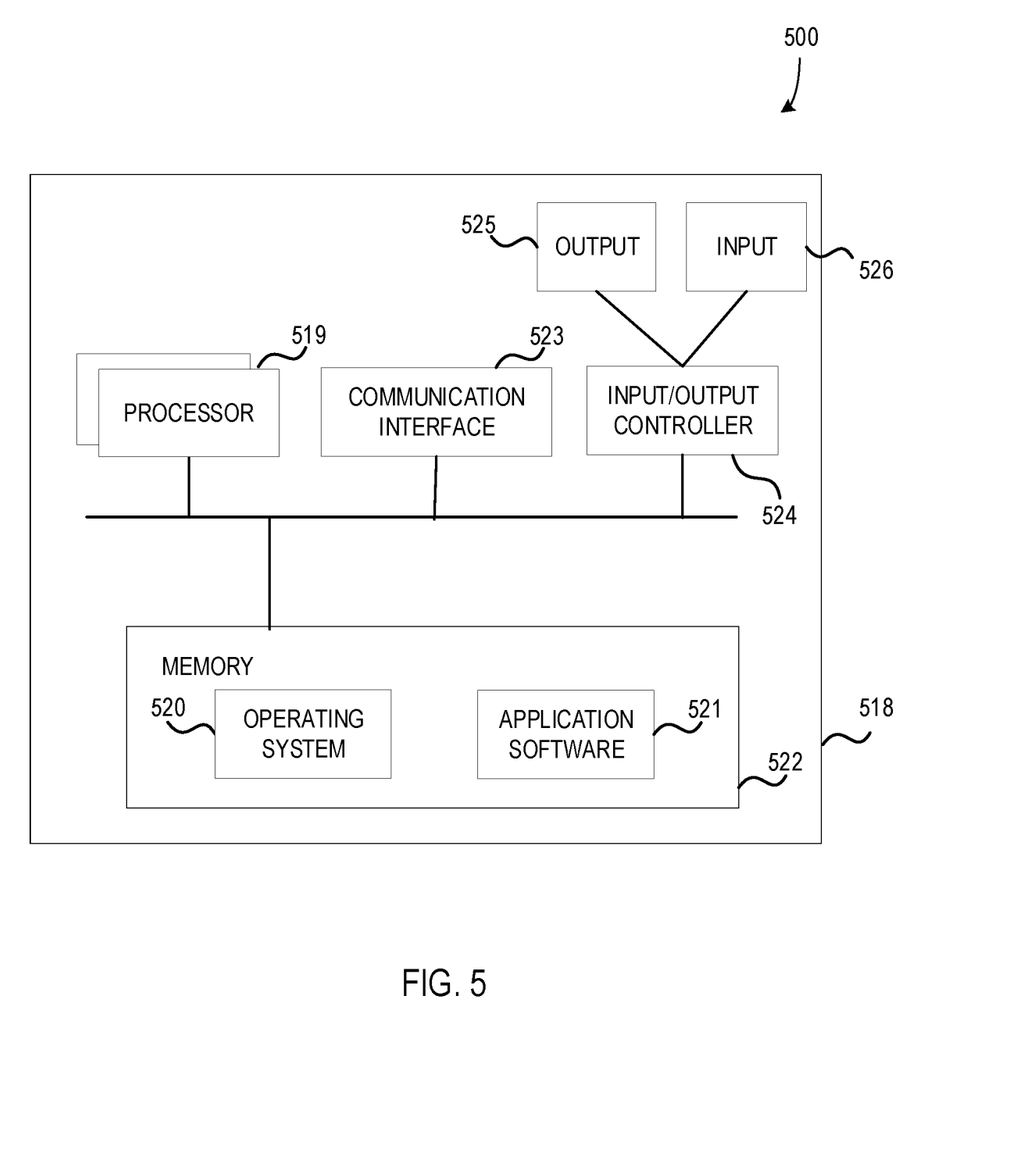
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, determining implicit consent to a transaction based on collected biometric data may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for determining implicit consent for a transaction from a user, the system comprising:
  at least one processor;
  at least one memory comprising computer program code, the at least one memory and computer program code configured to, with the at least one processor, cause the at least one processor to:
    receive a request to complete the transaction;
    collect biometric data associated with the user;
    receive context data associated with the biometric data;
    in response to the request to complete the transaction, generate weighted values of the biometric data and the context data based on defined consent rules;

upon the generated weighted values satisfying one or more consent thresholds, determine implicit consent for the transaction from the user; and based on the determined implicit consent and an authenticated identity of the user, authorize the transaction for completion.

The system described above, wherein the at least one processor and at least one memory are disposed on a wearable computing device of the user.

The system described above, wherein collecting biometric data associated with the user includes collecting biometric data by one or more biometric sensors of the wearable computing device based on contact with the user.

The system described above, wherein the biometric data includes at least one of pulse data, heart rate data, or galvanic skin response data.

The system described above, wherein the authenticated identity of the user is based on persistent authentication associated with the wearable computing device being worn by the user.

The system described above, wherein the context data includes at least one of location data, motion data, gesture data, voice data, or behavior pattern data.

The system described above, the at least one memory and computer program code configured to, with the at least one processor, further cause the at least one processor to prompt the user for explicit consent to the transaction upon the generated weighted values failing to satisfy one or more consent thresholds.

The system described above, the at least one memory and computer program code configured to, with the at least one processor, further cause the at least one processor to:

collect feedback associated with at least one of the implicit consent or the explicit consent to the transaction; and update, by machine learning, at least one of the consent rules or the one or more consent thresholds based on the collected feedback.

The system described above, the at least one memory and computer program code configured to, with the at least one processor, further cause the at least one processor to notify the user of the implicit consent upon the implicit consent being determined.

A computerized method for determining implicit consent for a transaction from a user by a wearable computing device of the user, the method comprising:

receiving a request to complete the transaction;

collecting biometric data associated with the user;

receiving context data associated with the biometric data;

in response to the request to complete the transaction, generating weighted values of the biometric data and the context data based on defined consent rules; and upon the generated weighted values satisfying one or more consent thresholds, determining implicit consent for the transaction from the user, whereby completion of the transaction is enabled.

The computerized method described above, wherein collecting biometric data associated with the user includes collecting biometric data by one or more biometric sensors of the wearable computing device based on contact with the user.

The computerized method described above, wherein the biometric data includes at least one of pulse data, heart rate data, or galvanic skin response data.

The computerized method described above, wherein the context data includes at least one of location data, motion data, gesture data, voice data, or behavior pattern data.

The computerized method described above, further comprising prompting the user for explicit consent to the transaction upon the generated weighted values failing to satisfy one or more consent thresholds.

The computerized method described above, further comprising: collecting feedback associated with at least one of the implicit consent or the explicit consent to the transaction; and updating, by machine learning, at least one of the consent rules or the one or more consent thresholds based on the collected feedback.

One or more computer storage media having computer-executable instructions for determining implicit consent to a transaction from a user that, upon execution by a processor, cause the processor to at least:

receive a request to complete the transaction;

collect, by a wearable computing device of the user, biometric data associated with the user;

receive, by the wearable computing device, context data associated with the biometric data;

in response to the request to complete the transaction, generate, by the wearable computing device, weighted values of the biometric data and the context data based on defined consent rules;

upon the generated weighted values satisfying one or more consent thresholds, determine, by the wearable computing device, implicit consent for the transaction from the user; and based on the determined implicit consent and an authenticated identity of the user, authorize the transaction for completion.

The one or more computer storage media described above, wherein collecting biometric data associated with the user includes collecting biometric data by one or more biometric sensors of the wearable computing device based on contact with the user.

The one or more computer storage media described above, wherein the biometric data includes at least one of pulse data, heart rate data, or galvanic skin response data.

The one or more computer storage media described above, wherein the context data includes at least one of location data, motion data, gesture data, voice data, or behavior pattern data.

The one or more computer storage media described above, the computer-executable instructions, upon execution by a processor, further cause the processor to at least prompt the user for explicit consent to the transaction upon the generated weighted values failing to satisfy one or more consent thresholds.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for facilitating a transaction by determining implicit consent based on collected biometric data. The illustrated one or more processors 519 together with the computer program code stored in memory 522 constitute exemplary processing means for determining implicit consent from a user to a transaction based on biometric data collected with a wearable computing device and defined consent rules.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining implicit consent for a transaction from a user, the system comprising:
    at least one processor;
    at least one memory comprising computer program code, the at least one memory and computer program code configured to, with the at least one processor, cause the at least one processor to:
    receive a request to complete the transaction;
    using a biometric interface, automatically collect biometric data associated with the user, the biometric interface including a skin contact interface comprising electrodes in contact with skin of the user that detect conductance of the skin between the electrodes to collect biometric data;
    receive context data including one or more of repeated transaction information of the user and transaction data of the user associated with recently collected biometric data;
    in response to the request to complete the transaction, applying consent rules to the biometric data and the context data to generate weighted data values;
    upon the generated weighted data values satisfying one or more consent thresholds, automatically determine that implicit consent of the user for authorization of the transaction is available from the user, without obtaining explicit consent from the user; and
    based on the automatically determined implicit consent and an authenticated identity of the user, authorize the transaction for completion without action being required by the user to provide consent to authorize the transaction.

2. The system of claim 1, wherein the biometric data includes a galvanic skin response and a heart rate, and generating the weighted data values includes determining whether values of the galvanic skin response and the heart rate are normal or abnormal and, upon determining that at least one value of the galvanic skin response or the heart rate is abnormal, generating at least one weighted data value that does not support the implicit consent.

3. The system of claim 1, wherein satisfying one or more consent thresholds includes determining whether a quantity of biometric data values exceeds a defined value, and upon the quantity of biometric data values not exceeding the defined value, withholding the implicit consent.

4. The system of claim 1, wherein the biometric data includes at least one of pulse data, heart rate data, or galvanic skin response data.

5. The system of claim 1, wherein the authenticated identity of the user is based on persistent authentication for a period of time associated with a wearable computing device being worn by the user, the persistent authentication for the period of time being determined based on the user continuing to wear the wearable computing device for the period of time.

6. The system of claim 1, wherein the at least one memory and computer program code are configured to, with the at least one processor, further cause the at least one processor to:
    obtain feedback from the user based on the determined implicit consent, wherein the feedback is positive if the determined implicit consent was accurate and the feedback is negative if the determined implicit consent was inaccurate; and
    upon determining that the feedback is positive, adjust the consent rules to reinforce determination of the implicit consent based on the consent rules, and upon determining that the feedback is negative, adjust the consent rules to improve the determination of the implicit consent based on the consent rules for use in determining subsequent implicit consent for a transaction.

7. The system of claim 1, the at least one memory and computer program code configured to, with the at least one processor, further cause the at least one processor to prompt the user for explicit consent to the transaction upon the generated weighted data values failing to satisfy one or more consent thresholds; and
    upon the user providing the explicit consent, adjust the consent rules such that applying the adjusted consent rules to the biometric data and the context data results in generation of larger weighted data values that satisfy the one or more consent thresholds.

8. The system of claim 1, wherein the consent rules determine a weight to be applied to the biometric data based on the context data.

9. The system of claim 1, wherein the weighted data values are based on a range associated with biometric data and values of the biometric data fall within the range.

10. A computerized method for determining implicit consent for a transaction from a user by a wearable computing device of the user, the method comprising:
receiving a request to complete the transaction;
automatically collecting biometric data associated with the user using a biometric interface, the biometric interface including a skin contact interface comprising electrodes in contact with skin of the user that detect conductance of the skin between the electrodes to collect biometric data;
receiving context data including one or more of repeated transaction information of the user and transaction data of the user associated with recently collected biometric data;
in response to the request to complete the transaction, apply consent rules to the biometric data and the context data to generate weighted data values;
upon the generated weighted data values satisfying one or more consent thresholds, automatically determining that implicit consent of the user for authorization of the transaction is available from the user, without obtaining explicit consent from the user; and
based on the automatically determined implicit consent and an authenticated identity of the user, authorizing the transaction for completion without action being required by the user to provide consent to authorize the transaction.

11. The computerized method of claim 10, wherein the biometric data includes a galvanic skin response and a heart rate, and generating the weighted data values includes determining whether values of the galvanic skin response and the heart rate are normal or abnormal and, upon determining that at least one value of the galvanic skin response or the heart rate is abnormal, generating at least one weighted data value that does not support the implicit consent.

12. The computerized method of claim 10, wherein satisfying one or more consent thresholds includes determining whether a quantity of biometric data values exceeds a defined value, and upon the quantity of biometric data values not exceeding the defined value, withholding the implicit consent.

13. The computerized method of claim 10, further comprising:
obtaining feedback from the user based on the determined implicit consent, wherein the feedback is positive if the determined implicit consent was accurate and the feedback is negative if the determined implicit consent was inaccurate; and
upon determining that the feedback is positive adjusting the consent rules to reinforce determination of the implicit consent based on the consent rules, and upon determining that the feedback is negative, adjusting the consent rules to improve the determination of the implicit consent based on the consent rules for use in determining subsequent implicit consent for a transaction.

14. The computerized method of claim 10, further comprising prompting the user for explicit consent to the transaction upon the generated data weighted values failing to satisfy one or more consent thresholds.

15. The computerized method of claim 10, wherein the consent rules determine a weight to be applied to the biometric data based on the context data.

16. One or more computer storage media having computer-executable instructions for determining implicit consent to a transaction from a user that, upon execution by a processor, cause the processor to at least:
receive a request to complete the transaction;
automatically collect, by a wearable computing device of the user, biometric data associated with the user using a biometric interface, the biometric interface including a skin contact interface comprising electrodes in contact with skin of the user that detect conductance of the skin between the electrodes to collect biometric data;
receive, by the wearable computing device, context data including one or more of repeated transaction information of the user and transaction data of the user associated with recently collected biometric data;
in response to the request to complete the transaction, apply consent rules to the biometric data and the context data to generate, by the wearable computing device, weighted data values;
upon the generated weighted data values satisfying one or more consent thresholds, automatically determine, by the wearable computing device, that implicit consent of the user for authorization of the transaction from the user is available, without obtaining explicit consent from the user; and
based on the automatically determined implicit consent and an authenticated identity of the user, authorize the transaction for completion without action being required by the user to provide consent to authorize the transaction.

17. The one or more computer storage media of claim 16, wherein the biometric data includes a galvanic skin response and a heart rate and generating the weighted data values includes determining whether values of the galvanic skin response and the heart rate are normal or abnormal and, upon determining that at least one value of galvanic skin response or the heart rate is abnormal, generating at least one weighted data value that does not support the implicit consent.

18. The one or more computer storage media of claim 17, wherein satisfying one or more consent thresholds includes determining whether a quantity of biometric data values exceeds a defined value, and upon the quantity of biometric data values not exceeding the defined value, withholding the implicit consent.

19. The one or more computer storage media of claim 16, wherein the computer-executable instructions, upon execution by a processor, further cause the processor to:
obtain feedback from the user based on the determined implicit consent, wherein the feedback is positive if the determined implicit consent was accurate and the feedback is negative if the determined implicit consent was inaccurate; and
upon determining that the feedback is positive, adjust the consent rules to reinforce determination of the implicit consent based on the consent rules, and upon determining that the feedback is negative, adjust the consent rules to improve the determination of the implicit consent based on the consent rules for use in determining subsequent implicit consent for a transaction.

20. The one or more computer storage media of claim 16, wherein the authenticated identity of the user is based on persistent authentication for a period of time associated with the wearable computing device being worn by the user, the persistent authentication for the period of time being determined based on the user continuing to wear the wearable computing device for the period of time.

* * * * *